J. Simpson,
Band Pulley.
Nº 4,618.                    Patented July 7, 1846.
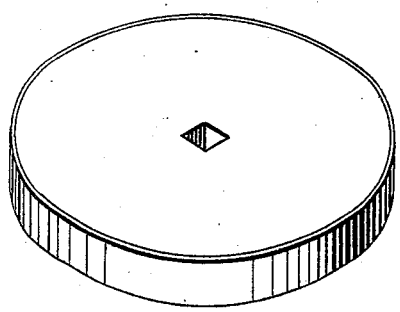

UNITED STATES PATENT OFFICE.

JOHN SIMPSON, OF DECATUR, GEORGIA.

BAND-PULLEY.

Specification of Letters Patent No. 4,618, dated July 7, 1846.

*To all whom it may concern:*

Be it known that I, JOHN SIMPSON, of Decatur, in the county of Dekalb and State of Georgia, have invented a new and Improved Manner of Forming Faces of Drums, Pulleys, &c., in Which Bands are Used for Propelling Machinery or other Purposes; and I do hereby declare the following to be a full and exact description thereof, reference being had to the accompanying drawing, making a part of this specification.

The nature of my invention consists in greatly increasing the adhesiveness between a belt and the drum or pulley which it passes over and receives motion from, or communicates motion to, without increasing its tension. This I perfectly and permanently accomplish by covering the face of the driving and receiving drum or pulley with a coating of india rubber secured in any convenient manner.

The accompanying drawing is a perspective view of a pulley, detached from its shaft, having a coating of india rubber upon its face or periphery.

The giving an india rubber covering to a drum or pulley greatly increases the power of a belt, prevents all danger of its slipping, and very considerably reduces friction, in consequence of less tension of the band being required to produce a given effect when the drum or pulley is prepared in this manner.

What I claim as my invention and desire to secure by Letters Patent, is—

The giving the face or periphery of drums, pulleys, &c., upon which bands are used, a coating of india rubber, or some other gum covering of a similar nature, for the purpose herein set forth.

JOHN SIMPSON.

Witnesses:
 Z. C. ROBBINS,
 JOHN M. THAYER.